US009481935B2

(12) United States Patent
Bukeikhanova et al.

(10) Patent No.: US 9,481,935 B2
(45) Date of Patent: Nov. 1, 2016

(54) AQUEOUS COMPOSITION FOR PRETREATING A METAL SURFACE BEFORE APPLYING ANOTHER COATING OR FOR TREATING SAID SURFACE

(75) Inventors: Saule Bukeikhanova, Frankfurt (DE); Mathias Komander, Lange (DE)

(73) Assignee: Chemetall GmbH, Frankfurt am Main (DE)

( * ) Notice: Subject to any disclaimer, the term of this patent is extended or adjusted under 35 U.S.C. 154(b) by 492 days.

(21) Appl. No.: 13/881,833

(22) PCT Filed: Oct. 26, 2011

(86) PCT No.: PCT/EP2011/068742
§ 371 (c)(1),
(2), (4) Date: Jun. 10, 2013

(87) PCT Pub. No.: WO2012/055908
PCT Pub. Date: May 3, 2012

(65) Prior Publication Data
US 2013/0295292 A1    Nov. 7, 2013

(30) Foreign Application Priority Data

Oct. 27, 2010    (DE) .................. 10 2010 043 002

(51) Int. Cl.
| | | |
|---|---|---|
| C23C 22/48 | (2006.01) | |
| C23F 11/18 | (2006.01) | |
| C09D 5/08 | (2006.01) | |
| C09D 183/04 | (2006.01) | |
| C23C 22/60 | (2006.01) | |
| C23C 22/66 | (2006.01) | |
| C23C 22/68 | (2006.01) | |
| C23C 22/74 | (2006.01) | |
| C23C 22/83 | (2006.01) | |
| C09J 183/04 | (2006.01) | |
| C08G 77/26 | (2006.01) | |

(52) U.S. Cl.
CPC .............. *C23F 11/182* (2013.01); *C09D 5/08* (2013.01); *C09D 183/04* (2013.01); *C09J 183/04* (2013.01); *C23C 22/60* (2013.01); *C23C 22/66* (2013.01); *C23C 22/68* (2013.01); *C23C 22/74* (2013.01); *C23C 22/83* (2013.01); *C08G 77/26* (2013.01); *C23C 2222/20* (2013.01)

(58) Field of Classification Search
CPC ........ C09D 1/04; C09D 5/08; C09D 183/04; C23F 11/182; C08G 77/26; C09J 183/04
See application file for complete search history.

(56) References Cited

U.S. PATENT DOCUMENTS

| | | | | |
|---|---|---|---|---|
| 3,721,574 | A * | 3/1973 | Schneider | ............... C04B 28/26 106/623 |
| 4,828,616 | A | 5/1989 | Yamasoe | |
| 5,412,011 | A | 5/1995 | Morris et al. | |
| 5,415,688 | A | 5/1995 | Gasmena et al. | |
| 5,451,431 | A | 9/1995 | Purnell et al. | |
| 6,478,886 | B1 | 11/2002 | Kunz et al. | |
| 7,232,479 | B2 * | 6/2007 | Poulet | .................... C23C 22/60 106/14.05 |
| 2007/0134503 | A1 * | 6/2007 | Espinosa | ................... C09D 4/00 428/450 |
| 2009/0252952 | A1 | 10/2009 | Noh et al. | |
| 2010/0006006 | A1 * | 1/2010 | Bohlander | ............ C01B 33/325 106/287.13 |
| 2010/0297454 | A1 | 11/2010 | Sakurai et al. | |
| 2012/0052312 | A1 * | 3/2012 | Xu | .......................... C09D 5/08 428/450 |

FOREIGN PATENT DOCUMENTS

| | | |
|---|---|---|
| DE | 198 14 605 A1 | 10/1999 |
| EP | 0 648 823 A1 | 4/1995 |
| EP | 2 223 975 | 9/2010 |
| JP | 5250940 A | 4/1977 |
| JP | 08-283107 A * | 10/1996 |
| JP | 09-328375 A * | 12/1997 |
| KR | 10-2011-0046214 A * | 5/2011 |
| WO | WO 2004/033116 A1 * | 4/2004 |
| WO | 2007/075050 A1 | 7/2007 |
| WO | WO 2009/072648 A1 * | 6/2009 |

OTHER PUBLICATIONS

Derwent-Acc-No: 2002-505463, abstract of Korean Patent Specification No. KR 2002003714 A (Jan. 2002).*
Derwent-Acc-No: 2010-F96399, abstract of Chinese Patent Specification No. CN 101709163 A (May 2010).*

* cited by examiner

*Primary Examiner* — Anthony J Green
(74) *Attorney, Agent, or Firm* — Jeremy J. Kliebert

(57) ABSTRACT

The present invention relates to an aqueous composition for pretreating a metallic surface before further coating or for treating said surface. The aqueous composition is obtained by adding a) at least [one] sodium, potassium, and/or ammonium water glass and b) at least one silane to water. The quantity ratio of a) to b), in each case including the resulting reaction products, is preferably in the range of 0.1:1 to 2:1.

13 Claims, No Drawings

AQUEOUS COMPOSITION FOR PRETREATING A METAL SURFACE BEFORE APPLYING ANOTHER COATING OR FOR TREATING SAID SURFACE

This application is a §371 of International Application No. PCT/EP2011/068742 filed Oct. 26, 2011, and claims priority from German Patent Application No. 10 2010 043 002.1filed Oct. 27, 2010.

The invention relates to an aqueous composition for pretreating a metallic surface before further coating or for treating said surface.

For corrosion protection of metallic construction materials, various methods are used which are designed to protect the surface and improve the adhesion of coating layers. By applying chromium(VI)- or chromium(III)-containing phosphate layers to metallic construction materials, such as hot-galvanized (hot dip-galvanized) or rolled steel (HDG, Z, "galvanneal"), electrolytically galvanized (EZ) steel, zinc/aluminum deposition ("Galfan," ZA), aluminum/zinc deposition ("Galvalume," AZ), zinc/magnesium (ZMg), aluminum, prehardened corrosion-resistant steel (CRS), or pure zinc, the surface thereof is passivated against electrochemical corrosion attack, and the adhesion of coating layers is improved. With regard to toxic properties of chromium(VI) as well as chromium(III) compounds, efforts have been made to reduce or completely avoid content thereof in the aqueous composition, and the surface coatings thus formed, used for pretreating a metallic surface before further coating.

The document DE 19814605 A1 describes an aqueous dispersion for sealing metallic surfaces, containing at least one silane derivative and a colloidal silicic acid and/or a colloidal silicate. As silane derivative, epoxy and/or hydrolyzed epoxysilanes such as glycidyloxypropyltrimethoxysilane or hydroxylated 3-glycidyloxypropyltrimethoxysilane together with lithium polysilicate are used. However, compared to the known chromating processes, the described aqueous dispersions have distinct disadvantages with regard to the corrosion protection thus achieved for the metallic construction materials treated in this way. Therefore, there is still a need for an aqueous composition for pretreating a metallic surface before further coating or for treating surfaces of metallic construction materials.

The stated object is achieved by an aqueous composition for pretreating a metallic surface before further coating or for treating said surface, the aqueous composition being obtained by adding a) at least [one] sodium, potassium, and/or ammonium water glass and b) at least one silane to water, the quantity ratio of a) to b), in each case including the resulting reaction products, preferably being in the range of 0.1:1 to 2:1. Completely demineralized (DM) water in the technical sense, having a conductivity in the range of 0.01 to 1.00 µS/cm, or comparable distilled water is preferably used as water.

The aqueous composition is advantageously obtained by adding a) at least one water glass in a quantity of 0.5 to 30% by weight and b) at least one silane in a quantity of 0.05 to 5% by weight to water.

Particularly preferred are aqueous compositions in which the concentration in the composition used for the pretreatment corresponds to a) 0.5 to 10% by weight water glass and b) 0.05 to 2% by weight silane.

In a concentrate of the aqueous composition, the concentration corresponds to a) 10 to 30% by weight water glass and b) 1.5 to 5% by weight silane.

The silane in the aqueous composition preferably contains one or two amino groups.

The silane contains one or more amino groups, and is selected from the group composed of aminoalkylaminoalkylalkyldialkoxysilane, bis(trialkoxysilylalkyl)amine, aminoalkyltrialkoxysilane, aminoalkylaminoalkyltrialkoxysilane.

In particular, the silane contains one amino group, and is selected from the group composed of bis(triethoxysilylpropyl)amine, bis(trimethoxysilylpropyl)amine, gamma-aminopropyltriethoxysilane, gamma-aminopropyltrimethoxysilane.

Alternatively, the aminosilane contains two or more amino groups, and is selected from the group composed of gamma-ureidopropyltrialkoxysilane, N-(3-(trimethoxysilyl)propyl)ethylenediamine, N-beta-(aminoethyl)-gamma-aminopropyltriethoxysilane, N-beta-(aminoethyl)-gamma-aminopropyltrimethoxysilane, N-(gamma-triethoxysilylpropyl)diethylenetriamine, N-(gamma-trimethoxysilylpropyl)diethylenetriamine, polyaminoalkylethyldialkoxysilane, polyaminoalkylmethyldialkoxysilane.

In addition, c) at least one organic corrosion inhibitor selected from heterocyclic compounds, carbonic acid amides, and/or acetylacetonates is advantageously added in a quantity of 0.01 to 3% by weight to the aqueous composition.

The heterocyclic compounds are selected from the group composed of mercaptobenzothiazole, benzotriazole, imidazole, benzimidazole, hydroxyquinoline, 2-mercaptobenzimidazole, and the carbonic acid amides are selected from the group composed of urea, thiourea, dimethylurea, diethylurea, dibutylurea, allylthiourea, methylthiourea, and thiosemicarbazide, and/or the acetylacetonates are selected from the group composed of the acetylacetonates of the metals manganese, vanadium, titanium, and zirconium.

The organic corrosion inhibitor is preferably added to the aqueous composition in a quantity of 0.01 to 0.7% by weight in the composition used for the pretreatment.

In the concentrate of the aqueous composition, the organic corrosion inhibitor is added in a quantity of 0.5 to 3% by weight.

In addition, d) at least one additive selected from dyes or UV light indicators, wetting agents or flow control additives, and/or pH regulators is advantageously added in a quantity of 0.01 to 15% by weight to the aqueous composition.

Rhodamine B, malachite green, eosin B, sodium fluorescein, Ciba Blue, Ciba Yellow, EXP0665 UV, Optical Brightener CBS-X are added as dyes or UV light indicators; Triton DF-16, Zonyl® FSO are added as wetting agents or flow control additives; and/or acetic acid, ammonia, potassium hydroxide, sodium hydroxide, nitric acid, phosphoric acid, or sulfuric acid are added as pH regulators to the aqueous composition.

In the aqueous composition used for the pretreatment, the additive is added in a quantity of 0.01 to 5% by weight of the composition.

In the concentrate of the aqueous composition, the additive is added in a quantity of 0.5 to 15% by weight of the composition.

According to the invention, the aqueous composition is prepared by adding a) at least [one] sodium, potassium, and/or ammonium water glass and b) at least one silane to water, the quantity ratio of a) to b), in each case including the resulting reaction products, preferably being in the range of 0.1:1 to 2:1. As a rule, for this purpose DM water having a conductivity in the range of 0.01 to 1,00 µS/cm is provided, optionally with the addition of corrosion inhibitors, and, if necessary, is dissolved by adjusting the pH, using acids and/or bases. The further additives, if applicable, are subsequently added. The quantity of water glass, and then the undiluted silane, are added to the aqueous composition, with stirring. Turbidity which occasionally occurs disappears after stirring for approximately 15 minutes.

The aqueous composition is applied to the metallic construction materials selected from the group composed of hot-galvanized or rolled steel, electrolytically galvanized steel, steel provided with zinc/aluminum deposition, aluminum/zinc deposition, or zinc/magnesium deposition, aluminum or aluminum alloys, prehardened corrosion-resistant steel. or pure zinc by rolling, flow coating, blade coating, spraying, sprinkling, brushing, or dipping, optionally with subsequent squeezing with a roller.

The metallic construction materials are preferably coated and passivated only with the aqueous composition. The appearance of the metallic construction is thus practically unchanged.

Alternatively, in each case at least one coating composed of printing ink, film, lacquer, lacquer-like material, powder lacquer, adhesive, and/or adhesive carrier is applied to the dried coating produced using the aqueous composition. Coatings are used which are selected from the classes of polyvinyl chloride, two-component (2K) epoxy primer, acrylate, 2K polyurethane, 2K fluoropolymer, and polyester systems.

The aqueous composition is advantageously applied to the metallic surface at a temperature in the range of 5 to 50° C., the metallic surface being held at temperatures in the range of 5 to 60° C. during the application, and the coated metallic surface being dried with recirculated air at a temperature in the range of 20 to 400° C.

The coated strips are wound into a coil, optionally after cooling to a temperature in the range of 40 to 70° C.

The substrates treated with the coating composition according to the invention show a pickling removal rate merely in the range of 0.01 to 2.0 g/m$^2$·h. The coating compositions are free of heavy metal and fluoride ions within the limits of measuring accuracy.

The invention is explained below with reference to twelve examples. The respective compositions are shown in Table 1. To this end, the aqueous compositions according to the invention were applied to alkaline-cleaned hot-galvanized steel sheets, using a laboratory coater. The respective applied layer was subsequently dried for one minute at 150° C. A coil coating lacquer system, composed of primer and topcoat based on an epoxy resin-bisphenol-A system and provided for architectural coatings, was applied and appropriately burned in.

The invention is explained in greater detail below with reference to five exemplary embodiments.

EXAMPLE 1

An aqueous composition composed of potassium water glass or sodium water glass in the range of 0.5 to 10% by weight and at least one aminosilane in the range of 0.05 to 2% by weight was applied to alkaline-cleaned hot-galvanized steel sheets, using a laboratory coater. The applied layer was then dried in a drying oven for one minute at a temperature of 150° C. A coil coating lacquer system, composed of a polyester/polyester-based primer and topcoat and provided for architectural coatings, was then applied and appropriately burned in.

A 2K polyester clearcoat was applied to protect the back sides of the sheets from corrosion.

After the samples were scribed in a defined manner, their corrosion properties were tested in a salt spray chamber. The adhesive strength of the coating was tested in the T-bend test.

| Lacquer chipping after T-bend test (%) | | NSS test according to DIN EN ISO 9227 (creepage from the scribe in mm) | | | | |
|---|---|---|---|---|---|---|
| T0 | T1 | 240 h | 360 h | 504 h | 720 h | 1008 h |
| 25 | 18 | <1 | <1 | 1 | 1.8 | 2.5 |

EXAMPLE 2

An aqueous composition composed of potassium water glass or sodium water glass in the range of 0.5 to 10% by weight, at least one aminosilane, containing two amino groups, in the range of 0.05 to 2% by weight, and at least one sulfur-containing carbonic acid amide in the range of 0.01 to 0.7% by weight was applied to alkaline-cleaned, hot-galvanized steel sheets, using a laboratory coater. The applied layer was then dried in a drying oven for one minute at a temperature of 150° C. A coil coating lacquer system, composed of a polyester/polyester-based primer and topcoat and provided for architectural coatings, was then applied and appropriately burned in.

A 2K polyester clearcoat was applied to protect the back sides of the sheets from corrosion.

After the samples were scribed in a defined manner, their corrosion properties were tested in a salt spray chamber. The adhesive strength of the coating was tested in the T-bend test.

| Lacquer chipping after T-bend test | | NSS test according to DIN EN ISO 9227 (creepage from the scribe in mm) | | | | |
|---|---|---|---|---|---|---|
| T0 | T1 | 240 h | 360 h | 504 h | 720 h | 1008 h |
| <5% | only cracks | <1 | <1 | <1 | <1 | 1.8 |

EXAMPLE 3

An aqueous composition composed of potassium water glass or sodium water glass in the range of 0.5 to 10% by weight, at least one aminosilane, containing two amino groups, in the range of 0.05 to 2% by weight, at least one sulfur-containing heterocyclic compound in the range of 0.01 to 0.7% by weight, a basic additive for adjusting the pH in the range of 0.01 to 15% by weight, and at least one flow control additive in the range of 0.01 to 15% by weight was applied to alkaline-cleaned zinc/magnesium sheets, using a laboratory coater. The applied layer was then dried in a drying oven for one minute at a temperature of 150° C. A coil coating lacquer system, composed of a polyurethane/polyester-based primer and topcoat and provided for architectural coatings, was then applied and appropriately burned in.

A 2K polyester clearcoat was applied to protect the back sides of the sheets from corrosion.

After the samples were scribed in a defined manner, their corrosion properties were tested in a salt spray chamber. The adhesive strength of the coating was tested in the T-bend test.

| Lacquer chipping after T-bend test | | NSS test according to DIN EN ISO 9227 (creepage from the scribe in mm) | | | | |
|---|---|---|---|---|---|---|
| T0 | T1 | 240 h | 360 h | 504 h | 720 h | 1008 h |
| only cracks | only cracks | <1 | <1 | <1 | <1 | 1 |

EXAMPLE 4

The aqueous composition, composed of potassium water glass or sodium water glass in the range of 0.5 to 10% by weight and at least one aminosilane, containing two amino groups, in the range of 0.05 to 2% by weight was applied to alkaline-cleaned aluminum sheets, using a laboratory coater. The applied layer was then dried in a drying oven for one minute at a temperature of 150° C. A coil coating lacquer system, composed of a polyester/polyester-based primer and topcoat and provided for architectural coatings, was then applied and appropriately burned in.

A 2K polyester clearcoat was applied to protect the back sides of the sheets from corrosion.

After the samples were scribed in a defined manner, their corrosion properties were tested in a salt spray chamber. The adhesive strength of the coating was tested in the T-bend test.

| Lacquer chipping after T-bend test | | NSS test according to DIN EN ISO 9227 (creepage from the scribe in mm) | | | | |
|---|---|---|---|---|---|---|
| T0 | T1 | 240 h | 360 h | 504 h | 720 h | 1008 h |
| only cracks | only cracks | 0 | 0 | 0 | <1 | <1 |

EXAMPLE 5

The aqueous composition, composed of potassium water glass or sodium water glass in the range of 0.5 to 10% by weight, at least one aminosilane, containing two amino groups, in the range of 0.05 to 2% by weight, and at least one metal-containing acetylacetonate in the range of 0.01 to 0.7% by weight was applied to alkaline-cleaned Galfan sheets, using a laboratory coater. The applied layer was then dried in a drying oven for one minute at a temperature of 150° C. A coil coating lacquer system, composed of a polyester/polyurethane-based primer and topcoat and provided for architectural coatings, was then applied and appropriately burned in.

A 2K polyester clearcoat was applied to protect the back sides of the sheets from corrosion.

After the samples were scribed in a defined manner, their corrosion properties were tested in a salt spray chamber. The adhesive strength of the coating was tested in the T-bend test.

| Lacquer chipping after T-bend test | | NSS test according to DIN EN ISO 9227 (creepage from the scribe in mm) | | | | |
|---|---|---|---|---|---|---|
| T0 | T1 | 240 h | 360 h | 504 h | 720 h | 1008 h |
| OK | OK | <1 | 1 | 1.2 | 2.3 | 2.6 |

The invention claimed is:

1. An aqueous composition for pretreating a metallic surface before further coating or for treating said surface, prepared by the process comprising the steps of:
   adding to water a) at least one water glass selected from the group consisting of sodium water glass, potassium water glass and ammonium water glass; and b) a silane,
   wherein the water glass is added in an amount of 0.5 to 30% by weight of the aqueous composition, and the silane is added in an amount of 0.05 to 2% by weight of the aqueous composition, and
   wherein the silane is an aminosilane selected from the group consisting of a gamma-ureidopropyltrialkoxysilane, N-(3-(trimethoxysilyl)propyl)ethylenediamine, N-beta-(aminoethyl)-gamma-aminopropyltriethoxysilane, N-beta-(aminoethyl)-gamma-aminopropyltrimethoxysilane, N-(gamma-triethoxysily1propyl)diethylenetriamine, N-(gammatrimethoxysilylpropyl)diethylenetriamine, a polyaminoalkylethyldialkoxysilane, and a polyaminoalkylmethyldialkoxysilane,
   wherein the aqueous composition further comprises an organic corrosion inhibitor selected from the group consisting of a heterocyclic compound, a carbonic acid amide and an acetylacetonate, wherein the organic corrosion inhibitor is present in an amount of from 0.01 to 3% by weight of the aqueous composition.

2. An aqueous composition according to claim 1, wherein the organic corrosion inhibitor is selected from the group consisting of mercaptobenzothiazole, benzotriazole, imidazole, benzimidazole, hydroxyquinoline, 2-mercaptobenzimidazole, urea, thiourea, dimethylurea, diethylurea, dibutylurea, allylthiourea, methylthiourea, and thiosemicarbazide, an acetylacetonate of manganese, an acetylacetonate of vanadium, an acetylacetonate of titanium and an acetylacetonate of zirconium.

3. An aqueous composition according to claim 1, wherein the organic corrosion inhibitor is added in a quantity of 0.01 to 0.7% by weight of the aqueous composition.

4. A concentrate of an aqueous composition according to claim 1, wherein the organic corrosion inhibitor is added in a quantity of 0.5 to 3% by weight of the concentrate.

5. An aqueous composition according to claim 1, further comprising an additive selected from the group consisting of a dye, an UV light indicator, a wetting agent, a flow control additive and a pH regulator, wherein the additive is added in a quantity of 0.01 to 15% by weight of the aqueous composition.

6. An aqueous composition according to claim 5, wherein the additive is selected from the group consisting of Rhodamine B, malachite green, eosin B, sodium fluorescein, acetic acid, ammonia, potassium hydroxide, sodium hydroxide, nitric acid, phosphoric acid, and sulfuric acid.

7. An aqueous composition according to claim 5, wherein the additive is added in a quantity of 0.01 to 5% by weight of the aqueous composition.

8. An aqueous composition according to claim 5, wherein the additive is added in a quantity of 0.5 to 15% by weight of the aqueous composition.

9. A method for pretreating a metallic surface before further coating or for treating said surface, the method comprising
   applying the aqueous composition of claim 1 to a metallic surface having a temperature in the range of 5 to 50° C., and holding the metallic surface at one or more temperatures in the range of 5 to 60° C. during the applying, to form a coated metallic surface, and drying the coated metallic surface with recirculated air at one or more temperatures in the range of 20 to 400° C.

10. A method according to claim 9, wherein the metallic surface is a metallic construction material selected from the group consisting of hot-galvanized steel, rolled steel, electrolytically galvanized steel, steel provided with zinc/aluminum deposition, steel provided with aluminum/zinc deposition, steel provided with zinc/magnesium deposition, aluminum, an aluminum alloy, a prehardened corrosion-resistant steel and pure zinc.

11. A method according to claim 10, wherein the aqueous composition is applied to the metallic construction material by an application technique selected from the group consisting of rolling, flow coating, blade coating, spraying, sprinkling, brushing and dipping.

12. A method according to claim 10, wherein the aqueous composition forms the only coating on the metallic construction material.

13. A method according to claim 9, further comprising applying to the coated metal surface another coating selected from the group consisting of a printing ink, a film, a lacquer, a powder lacquer, an adhesive, and an adhesive carrier.

* * * * *